United States Patent [19]

Miyashita et al.

[11] Patent Number: 5,062,890
[45] Date of Patent: Nov. 5, 1991

[54] WATER-BASED INK COMPOSITION FOR BALL-POINT PEN

[75] Inventors: Hiroshi Miyashita, Koshigaya; Hideotoshi Hamamoto, Ishioka; Shigeru Nagai, Toda; Makoto Yamaguchi, Koshigaya; Onuki Isao, Kasukabe; Hiroshi Takahashi; Atsushi Ishiguro, both of Ibraki, all of Japan

[73] Assignee: Pentel Kabushiki Kaisha, Tokyo, Japan

[21] Appl. No.: 423,527

[22] Filed: Oct. 16, 1989

Related U.S. Application Data

[63] Continuation of Ser. No. 161,289, Feb. 29, 1988, abandoned, which is a continuation of Ser. No. 890,377, Jul. 29, 1986, abandoned.

[30] Foreign Application Priority Data

Jul. 29, 1985 [JP] Japan ................................ 60-167046

[51] Int. Cl.$^5$ ............................................ C09D 11/06
[52] U.S. Cl. ........................................ 106/27; 106/20; 106/22; 106/23; 260/DIG. 38; 523/161; 524/577; 524/578
[58] Field of Search ........................ 106/22, 23, 27, 20; 260/DIG. 38; 523/161; 524/577, 578

[56] References Cited

U.S. PATENT DOCUMENTS

| | | | |
|---|---|---|---|
| 3,875,105 | 4/1975 | Daugherty et al. | 523/161 |
| 3,950,290 | 4/1976 | Drury, Jr. et al. | 106/30 |
| 3,961,965 | 6/1976 | Zwehlen et al. | 106/26 |
| 4,329,264 | 5/1982 | Muller | 524/322 |
| 4,460,727 | 7/1984 | Shoji | 106/23 |
| 4,471,079 | 9/1984 | Enami | 523/161 |
| 4,536,307 | 8/1985 | Horodysky | 564/8 |
| 4,536,311 | 8/1985 | Horodysky | 548/347 |

OTHER PUBLICATIONS

Derwent Abstract Accession No. 83-785873/41, Japanese Patent No. J58147469, Sep. 2, 1983.
Derwent Abstract Accession No. 78-32595A/18, Japanses Patent No. J53029807, Mar. 20, 1978.
Derwent Abstract Accession No. 82-66647E/32, Japanese Patent No. J57105470, Jun. 30, 1982.

*Primary Examiner*—Amelia Burgess Yarbrough
*Attorney, Agent, or Firm*—Wenderoth, Lind & Ponack

[57] ABSTRACT

A water-based ink composition for a ball-point pen comprises: a colorant selected from dyes or pigments; a water-soluble organic solvent; water; and a metal salt and/or an amine salt of N-acyl sarcosine. This ink can effectively prevent the wear of a ball seat of the pen caused by the rotation of a ball of the same to make it possible to keep good ink-discharging properties of the pen, whereby a smooth writing of the pen can be performed.

7 Claims, No Drawings

WATER-BASED INK COMPOSITION FOR BALL-POINT PEN

This application is a continuation of now abandoned application, Ser. No. 07/161,289 filed on Feb. 29, 1989, now abandoned, which in turn is a continuation of Ser. No. 06/890,377, filed July 29, 1986, now abandoned.

BACKGROUND OF THE INVENTION

1. Field of the Invention

The present invention relates to a water-based ink composition, and more particularly to one for a ball-point pen, which enables a ball seat of the pen to be substantially protected from wearing caused by the rotation of a ball of the pen so as to keep good ink-discharging properties of the pen.

2. Description of the Prior Art

In conventional water-based inks for ball-point pens, water-soluble dyes such as direct dyes, acid dyes, basic dyes and the like acting as colorants are dissolved in aqueous solutions of water-soluble organic solvents such as glycols, glycol ethers, glycol ether esters, amines and the like acting as evaporation inhibitors, in which inks further optionally dissolved are preservatives, anion or nonion surface-active agents and the like, as is well known. In the inks, organic or inorganic pigments may be employed as the colorants, and in this case dispersants are usually employed together with such colorants for dispersing the pigments in a stable manner.

However, in comparison with an oil-based ink having a large viscosity and acting as a lubricant, in case of the water-based ink being employed in the ball-point pen, there is a tendency to wear out the ball seat made of synthetic resins or metals due to the rotation of the ball in writing operation, which leads to the so-called ball retraction of the ball-point pen. When such ball retraction occurs, ink guide grooves in a tip of the ball-point pen are blocked off with the thus retracted ball so that the ink is prevented from being sufficiently discharged, whereby scratchy line appears in writing to prevent a smooth writing operation from being performed. This is a problem inherent in the conventional water-based ink type ball-point pen.

In recent year, in order to resolve such problem, a certain attempt is made in which a water-soluble cutting oil is added to the water-based ink. However, such attempt fails to obtain a sufficient effect and produces another problem of a lateral penetration of the ink in the paper.

SUMMARY OF THE INVENTION

It is an object of the present invention to resolve the above problems inherent in the water-based ink so as to provide a water-based ink for the ball-point pen, which may lubricates the ball in the ball seat to prevent the same from wearing out so that good ink-discharging properties of the pen are kept to ensure a smooth writing operation of the same.

The water-based ink for the ball-point pen according to the present invention comprising: a colorant consisting of a dye or a pigment; a water-soluble organic solvent; water; and a metal salt and/or amine salt of N-acyl sarcosine represented by the following formula:

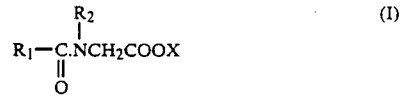

where: $R_1$ is a saturated or unsaturated hydrocarbon having 8 to 20 carbon atoms; $R_2$ is H or alkyl group having 1 to 3 carbon atoms; X is a metal such as Na, K and the like or an amine such as $NH_3$, $NH_2C_2H_4OH$ and the like.

When such ink of the present invention is employed, a frictional resistance between the ball and the ball seat decreases under the effect of the compound represented by the formula (I) so that the lubricating properties of the ink is increased to resolve the wear problem of the ball seat leading to the ball retraction and thus to resolve the scratchy line problem in writing.

In one of embodiments of the ink of the present invention, a low viscosity of from about 1 to about 20 cps (at a temperature of 25° C.: hereinafter the viscosity is measured at a temperature of 25° C.) may be employed as is in the case of the conventional water-based ink for the ball-point pen.

In another embodiment of the ink of the present invention, resins are added to the above ink composition to prepare an ink having a viscosity of from 50 to 2000 cps.

Generally, in case of an oil-based ink type ball-point pen employing a high viscosity oil-based ink, it is possible to simplify such pen in its construction because any ink-feeding member is not required between an ink reservoir portion and a tip of the ball-point pen. In addition to this advantage, the oil-based ink type ball-point pen is further advantageous in that it is possible to know the ink residue of the pen immediately. However, since the oil-based ink has a large viscosity of from several thousands to ten thousand cps, the ink is poor in its penetration in the paper in writing operation to produce droplets of the ink in the paper surface or to produce scratchy lines in writing, which are disadvantages inherent in the oil-based ink type ball-point pen. On the other hand, in case of the water-based ink type ball-point pen employing the water-based ink having a low viscosity, it is possible to obtain neat and clear lines in writing without any droplets of the ink in contrast with the case of the oil-based ink type ball-point pen. However, in contrast with this advantage, the water-based ink type ball-point pen suffers from its complex construction requiring the ink feeding member between the ink reservoir portion and the tip of the pen. Consequently, on one side, the water-based ink type ball-point pen is superior to the oil-based ink type ball-point pen, but on another side the former is inferior to the latter.

It is possible to obtain a ball-point pen provided with both advantages of the oil-based ink type ball-point pen and the water-based ink type ball-point pen, which is excellent in function and cost, provided that the water-based ink of the present invention having a viscosity of from 50 to 2000 cps is employed as described in the above in the pen, whereby it is possible to prevent the ball seat of the pen from being worn out.

DESCRIPTION OF THE PREFERRED EMBODIMENTS

The metal salts or amine salts of N-acyl sarcosine represented by the general formula (I) and employed in the present invention are more particularly obtained by neutralizing N-lauroyl sarcosine, N-myristoyl sarcosine, N-palmitoyl sarcosine, N-oleoyl sarcosine and the like with sodium hydroxide, triethanol amine and the like. These sarcosine compounds of general formula (I) may be used solely or in a mixture with one or more of these sarcosine compounds. An amount of the sarcosine compounds employed is generally in a range of from 0.01 to 10 wt. %, preferably from 0.5 to 7 wt. % of the total amount of the ink composition. When the amount of the sarcosine compound is less than 0.01 wt. %, it is difficult to obtain a sufficient lubrication effect in the tip of the ball-point pen. When the amount of such sarcosine compound is more than 10 wt. %, increment of the lubrication effect is not expected and an economical disadvantage is caused.

Organic solvents, dyes and pigments, which are other components of the ink of the present invention, are emplyed as is in the case of the conventional water-based ink, in the ink of the present invention. For example, as water-soluble organic solvents, it is possible to employ in the ink of the present invention the following compounds solely or in combination in an amount of from 5 to 40 wt. %, preferably from 10 to 35 wt. % of the total amount of the ink composition of the present invention, which compounds are: glycols such as ethylene glycol, diethylene glycol, propylene glycol and the like; glycol ethers such as ethylene glycol monomethylether, ethylene glycol monoethylether and the like; carbitols such as diethylene glycol monomethylether, diethylene glycol monoethylether and the like; sulfolan; thiodiethylene glycol; acetin; and the like. Incidentally, in the ink of the present invention, water is employed as the main solvent thereof in an amount of from 50 to 85 wt. % of the total amount of the ink composition of the present invention.

In the ink of the present invention, it is possible to employ, as dyes, water-soluble dyes such as acid dyes, direct dyes and basic dyes. As the acid dyes, there are: C.I.Acid Yellow 23; C.I.Acid Yellow 42; C.I.Acid Red 18; C.I.Acid Red 52; C.I.Acid Red 87; C.I.Acid Blue 1; C.I.Acid Blue 9; C.I.Acid Blue 90; and C.I.Acid Black 2, while as the direct dyes there are: C.I. Direct Black 19; C.I.Direct Black 38; C.I.Direct Blue 86; C.I.Direct Blue 15; C.I.Direct Red 80; C.I.Direct Red 75; and C.I.Direct Red 28. These dyes are employed solely or in combination in the ink of the present invention. Further, as the basic dyes, there are: C.I.Basic Yellow 35; C.I.-Basic Red 1; C.I.Basic Violet 1; C.I.Basic Blue 7; and C.I.Basic Blue 9, and these dyes are employed solely or in combination in the ink of the present invention. These water-soluble dyes are employed in the ink of the present invention in an amount of from 0.5 to 25 wt. %, preferably from 1.0 to 20 wt. % of the total amount of the ink composition of the present invention.

As the pigments, it is possible to employ commercially available pigments in the ink of the present invention. For example, as organic pigments, there are: phtalocyanine pigments such as Phtalocyanine Blue (C.I.74160); and Phtalocyanine Green (C.I.74260); azo pigments such as Hansa Yellow 3G (C.I.11670), Dis Azo Yellow GR (C.I.21100), Permanent Red 4R (C.I.12335), and Brilliant Carmine 6B (C.I.15850); quinacridone pigments such as Quinacridone Red (C.I.46500); condensed polyazo pigments; indigo pigments; thioindigo pigments; and the like. Further, inorganic pigments such as carbon black are also employed in the ink of the present invention. These pigments are employed in the ink of the present invention in an amount of from 5 to 20 wt. % of the total amount of the ink composition of the present invention in a preferable manner.

In case that the pigments are employed as colorants, it is necessary to employ pigment dispersants as is well known. As the pigment dispersants, hitherto conventionally employed dispersants may be employed in the ink of the present invention. Of the dispersants, the following ones have good stable pigment-dispersion properties in the ink composition of the present invention, which ones are: water-soluble amine salts or ammonium salts of copolymers composed of: hydrophilic addition-polymerizable monomers of an amount of up to 50 mol. %; and monomers of styrene and/or styrene derivatives of an amount of at least 50 mol. %. These dispersants are employed in the ink of the present invention in an amount of from 1 to 20 wt. %, preferably from 2 to 15 wt. % of the total amount of the ink composition of the present invention. Incidentally, the ratio of the monomers of styrene and/or styrene derivatives in the total amount of the all monomers employed is in a range of at least 50 mol. %, preferably of from 60 to 95 mol. %. When such ratio of the monomers of styrene and/or styrene derivatives is less than 50 mol. %, the line in writing is poor in water resistant properties, and when more than 95 mol. % the dispersant's effect is lost. For example, as the monomers of styrene and/or styrene derivatives, there are: styrene; α-methylstyrene; α-ethylstyrene; α-propylstyrene; α-butylstyrene; α-pentylstyrene; and the like. On the other hand, as the hydrophilic addition-polymerizable monomers, for example, there are: acrylic acid; methacrylic acid; ethacrylic acid; maleic acid; fumaric acid; and the like. Both monomer components described above are adequately combined to prepare the copolymer of pigment dispersant.

The viscosity of the water-based ink of the present invention may be in a low range of from 1 to 20 cps as is in the case of the water-based ink for the ball-point pen in use. In addition to the above, it is also possible to add resins to the water-based ink of the present invention to prepare a high viscosity ink having a viscosity in a range of from 50 to 2000 cps. By the use of such high viscosity water-based ink with the above viscosity range, it is possible to provide a boll-point pen which is provided with: advantages inherent in the oil-based ink type ball-point pen employing a high viscosity ink with a range of from several thousands to ten thousands cps; and advantages inherent in the water-based ink type ball-point pen employing a low viscosity water-base ink. As the resins employed for increasing the viscosity of the ink, for example, there are: styrene-maleic acid resins; pyrrolidone resins; cellurose derivatives; and the like.

Incidentally, in the ink of the present invention, it is possible to employ the following components as required in addition to the above components, which are: conventional wetting agents such as glycerin, urea, ethylene urea, and their derivatives; surface-active agents; antifreezing agents; preservatives; mildewproofing agent; rustproof agents; dyes for complementary color use; and the like additives.

In manufacturing of the ink of the present invention, in case that the dyes are employed as colorants, the above-mentioned components of the ink of the present invention are mixed and dissolved to be subjected to heating and agitation treatments so that the ink of the present invention is easily produced. On the other hand, in case that the pigments are employed as colorants, the components of the ink of the present invention are mixed to be subjected to mixing/crushing treatments and dispersion treatment in which the conventional dispersion mixers, for example such as ball mills, roller mills, sand mills, and attritors are employed.

Hereinbelow, the present invention will be described in more detail with reference to Examples of the ink of the present invention, in which Examples the description "part" means "part by weight".

EXAMPLE 1

| | |
|---|---|
| C.I. Acid Red 18 (dye) | 5.0 parts |
| sodium N-myristoyl sarcosinate | 0.5 part |

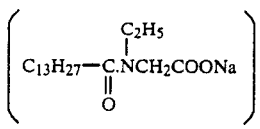

| | |
|---|---|
| ethylene glycol | 25 parts |
| water | 69.3 parts |
| surface-active agent | 0.2 part |
| ("Noygen P", Dai-Ichikogyo Seiyaku Co., Ltd.) | |

The above components are mixed and heated to a temperature of from 40° to 60° C. to be subjected to an agitation treatment for one hour so that a red ink having a viscosity of 4.0 cps is obtained.

Comparative Sample 1

A red ink is obtained in the same manner as that of the Example 1 except that an additional water is added in place of the sodium N-myristoyl sarcosinate employed in the Example 1.

EXAMPLE 2

| | |
|---|---|
| C.I. Acid Black 2 (dye) | 10.0 parts |
| sodium N-oleoyl-N-ethylglycinate | 0.1 part |

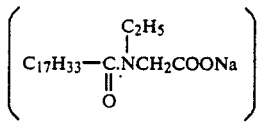

| | |
|---|---|
| propylene glycol | 20.0 parts |
| ethylene glycol monethyl ether | 10.0 parts |
| water | 59.5 parts |
| rustproof agent (benzotriazole) | 0.4 part |

A black ink having a viscosity of 8 cps is obtained by treating the above components in the same manner as that of the Example 1.

Comparative Sample 2

A black ink having a viscosity of 8 cps is obtained in the same manner as that of the Example 2 except that an additional water is added in place of the sodium N-oleoyl-N-ethylglycinate employed in the Example 2.

EXAMPLE 3

| | |
|---|---|
| C.I. Direct Black 19 (dye) | 8.0 parts |
| ammonium N-lauroyl glycinate | 2.0 parts |

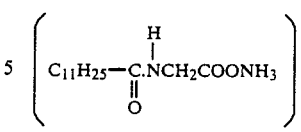

| | |
|---|---|
| ethylene glycol | 25.0 parts |
| water | 64.6 parts |
| preservative | 0.4 part |
| ("Proxel GXL", Imperial Chemical Industries.) | |

A black ink having a viscosity of 5.0 cps is obtained by treating the above components in the same manner as that of the Example 1.

EXAMPLE 4

A black ink having a viscosity of 5.0 cps is obtained in the same manner as that of the Example 3 except that the amount of the ammonium N-lauroyl glycinate employed in the Example 3 is reduced to 0.02 parts and the thus reduced amount thereof is replaced by an additional amount of water.

Comparative Sample 3

A black ink having a viscosity of 5.0 cps is obtained in the same manner as that of the Example 3 except that the ammonium N-lauroyl glycinate employed in the Example 3 is removed and in place of the same an additional water is added.

The following Table 1 shows test results as to the writing length, ball retraction after writing, and harsh noise in writing of a commercially available water-based ink type metallic ball-point pen ("Superball BBH 16", Pentel Co., Ltd.) which is charged with the inks obtained in the above Examples 1 to 4 and the Comparative Samples 1 to 3:

TABLE 1

| Test item | Writing length | Ball retraction | Harsh noise |
|---|---|---|---|
| Example | | | |
| 1 | 1400 m | 3/100 mm | none |
| 2 | 1400 m | 3/100 mm | none |
| 3 | 1600 m | 2/100 mm | none |
| 4 | 1200 m | 6/100 mm | none |
| Comparative Sample | | | |
| 1 | 600 m | 10/100 mm | present |
| 2 | 600 m | 11/100 mm | present |
| 3 | 600 m | 13/100 mm | present |

Remarks

Writing Length

By the use of a commercially available rolling type continuous-writing measuring instrument (coiling line type), a writing length before a scratchy line appears in a continous writing is measured under conditions of: a writing speed of 7 cm/sec; a writing load of 100 g; and a writing angle of 70°.

Ball Retraction

In the test of the writing length, the ball retraction is measured by detecting a difference in ball projection before writing and after a continuous 500 m writing.

Harsh Noise

In writing a coiling line by hand on a JIS P 3201 writing paper A, a harsh writing noise is observed. In the Table 1, the "present" shows the case in which the harsh noise is observed, while the "none" shows the case in which the harsh noise is not observed.

As is clear from the Table 1, in case that the inks of the Examples 1 to 4 of the present invention are employed in the water-based ink type ball-point pens, excellent effects in wear prevention and lubrication are obtained between the metallic ball and the tip of such ball-point pen, and even if the tip is made of synthetic resins such as polycarbonate as well as metal, excellent wear resistant properties of the pen is ensured to make it possible to remarkably increase the writing length with smooth writing feeling and/or make it possible to ensure the properties similar to those of the conventional water-based ink type ball-point pen with respect to a lateral penetration of the ink in the paper and a front-to-back penetration of the ink in the paper.

EXAMPLE 5

| | |
|---|---|
| C.I. Acid Black 154 (dye) ("Water Black 187 L", Orient Chemical Industries Ltd.) | 8 parts |
| sodium N-lauroyl sarcosinate ("Sarcosinate LN", Nikko Chemicals Ltd.) | 1.5 parts |
| ethylene glycol | 20 parts |
| glycerin (wetting agent) | 20 parts |
| water | 50 parts |
| carboxymethylcellulose | 0.5 part |

The above components are received in a flask provided with a reflux condenser, and subjected to dissolving treatment while heating and agitation, and then filtered out the unsoluble residue to prepare a black ink having a viscosity of 350 cps.

EXAMPLE 6

| | |
|---|---|
| C.I. Acid Blue 9 (dye) ("Water Blue #9", Orient Chemical Industries Ltd.) | 8 parts |
| sodium N-myristoyl sarcosinate ("Sarcosinate MN", Nikko Chemicals Ltd.) | 1.5 parts |
| ethylene glycol | 20 parts |
| glycerin | 20 parts |
| water | 50 parts |
| hydroxypropylcellulose ("HPC-(H)", Nippon Soda Co., Ltd.) | 0.5 part |

The above components are treated in the same manner as that of the Example 5 to prepare a blue ink having a viscosity of 350 cps.

Comparative Sample 4

A black ink is obtained in the same manner as that of the Example 5 except that the sodium N-lauroyl sarcosinate employed in the Example 5 is removed, and in place of the same an additional water is added, which black ink has a viscosity of 300 cps.

The following Table 2 shows test results as to the writing length of a ball-point pen a tip of which is made of nickel silver, a ball of which is made of hard metal, and an ink reservoir tube of which is charged with the inks obtained in the Examples 5 and 6 and the Comparative Sample 4, which reservoir is transparent:

TABLE 2

| Example | Writing length |
|---|---|
| 5 | 1480 m |
| 6 | 1650 m |
| Comparative Sample 4 | 400 m |

Remarks

A writing length before an amount of the ball retraction reaches 3/100 mm is measured under conditions of: a writing load of 100 g; a writing angle of 70°; a writing speed of 7 cm/sec; and a coiling line writing mode.

As is clear from the Table 2, according to the present invention, the ink viscosity is selected in a range of from 50 to 2000 cps to make it possible to effectively prevent the wear of the ball seat caused by the rotation of the ball so that the problem of the ball retraction leading to an ink shortage in writing is effectively resolved.

Further, by the use of the ink having such viscosity, it is possible to provide a ball-point pen provided with advantages of both of the oil-based ink type conventional ball-point pen employing a large viscosity oil-based ink and the water-based ink type conventional ball-point pen employing a low viscosity water-based ink.

EXAMPLE 7

| | |
|---|---|
| carbon black (C.I. 77265) (pigment) | 8.0 parts |
| ammonium salt of styrene-acrylic acid copolymer (dispersant) (molar ratio . . . styrene:acrylic acid = 60:40) | 8.0 parts |
| sodium N-myristoyl sarcosinate | 0.5 part |

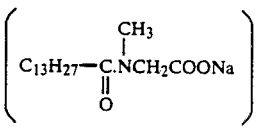

| | |
|---|---|
| ethylene glycol | 20.0 parts |
| water | 63.3 parts |
| rustproof agent (benzotriazole) | 0.2 part |

The above components are mixed, and premixed for two hours in the agitator, and thereafter crushed for 10 hours in the sand mill, and then filtered out coarse particles to obtain a black ink having a viscosity of 3.5 cps.

Comparative Sample 5

A black ink having a viscosity of 3.5 cps is obtained in the same manner as that of the Example 7 except that the sodium N-myristoyl sarcocinate is removed, and in place of the same an additional water is added.

EXAMPLE 8

| | |
|---|---|
| copper phthalocyanine green (C.I. 74260) (pigment) | 10.0 parts |
| ammonium salt of styrene-methacrylic acid copolymer (dispersant) (molar ratio . . . styrene:methacrylic acid = 70:30) | 10.0 parts |
| sodium N-oleoyl sarcosinate | 0.1 part |

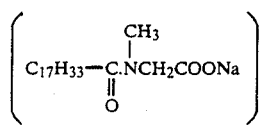

| | |
|---|---|
| ethylene glycol | 10.0 parts |
| glycerin | 10.0 parts |
| water | 59.9 parts |

The above components are mixed, and premixed for two hours in the agitator, and thereafter crushed in the ball mill for 15 hours, and then filtered out the coarse particles to obtain a green ink having a viscosity of 3.7 cps.

EXAMPLE 9

| | |
|---|---|
| copper phtalocyanine blue (C.I. 74160) (pigment) | 8.0 parts |
| ammonium salt of styrene-acrylic acid copolymer (dispersant) | 10.0 parts |
| ammonium N-lauroyl glycinate | 2.0 parts |

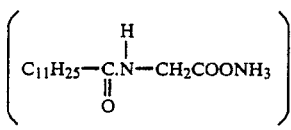

| | |
|---|---|
| propylene glycol | 15.0 parts |
| ethylene glycol | 15.0 parts |
| water | 49.6 parts |
| preservative ("Proxel GXL") | 0.4 part |

The above components are mixed, and premixed for two hours in the agitator, and thereafter crushed in the ball mill for 15 hours, and then filtered out the coarse particles to obtain a blue ink having a viscosity of 3.7 cps.

Comparative Sample 6

A blue ink is obtained in the same manner as that of the Example 9 except that the ammonium N-lauroyl glycinate is removed, and in place of the same an additional water is added, which blue ink has a viscosity of 3.7 cps.

EXAMPLE 10

| | |
|---|---|
| permanent red 4R (C.I. 12335) (pigment) | 15.0 parts |
| ammonium salt of styrene-maleic acid copolymer (dispersant) (molar ratio ... styrene:maleic acid = 85:15) | 15.0 parts |
| ammonium N-oleoyl sarcosinate | 0.5 part |

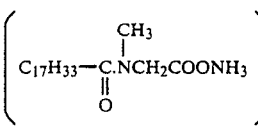

| | |
|---|---|
| propylene glycol | 10.0 parts |
| glycerin | 10.0 parts |
| water | 49.5 parts |

The above components are mixed, and premixed for two hours in the agitator, and thereafter crushed in the sand mill for 10 hours, and then filtered out the coarse particles to obtain a red ink having a viscosity of 3.9 cps.

Comparative Sample 7

A red ink having a viscosity of 3.9 cps is obtained in the same manner as that of the Example 10 except that the ammonium N-oleoyl sarcosinate employed in the Example 10 is removed, and in place of the same an additional water is added.

The following Table 3 shows test results as to the ball retraction of a commercially available water-based ink type metal ball-point pen ("Superball BH 16", Pentel Co., Ltd.) in which the inks obtained in the Examples 7 to 10 and the Comparative Samples 5 to 7 are charged. This test is conducted in the same manner as that of the Table 1:

TABLE 3

| | Ball retraction |
|---|---|
| Example | |
| 7 | 3/100 mm |
| 8 | 3/100 mm |
| 9 | 2/100 mm |
| 10 | 3/100 mm |
| Comparative Sample | |
| 5 | 11/100 mm |
| 6 | 13/100 mm |
| 7 | 13/100 mm |

As is clear from the Table 3, the water-based ink for the ball-point pen, which ink employs the pigment according to the present invention, can effectively prevent the ball seat from being worn out by the rotational action of the ball.

EXAMPLE 11

| | |
|---|---|
| carbon black (pigment) | 10 parts |
| amine salt of styrene-acrylic acid copolymer (dispersant) | 5 parts |
| sodium N-lauroyl sarcosinate ("Sarcosinate LN", Nikko Chemicals Ltd.) | 1.5 parts |
| ethylene glycol | 20 parts |
| glycerin | 13 parts |
| water | 50 parts |
| carboxymethylcellulose | 0.5 part |

The above components, except carboxymethylcellulose and sodium N-lauroyl sarcosinate, are mixed and subjected to dispersion treatment in the ball mill, and thereafter the above eliminated two components are added so that the dispersion treatment is again conducted, and then the coarse particles are filtered out to obtain a black ink having a viscosity of 380 cps.

Comparative Sample 8

A black ink having a viscosity of 370 cps is obtained in the same manner as that of the Example 11 except that the sodium N-lauroyl sarcosinate employed in the Example 11 is removed, and in place of the same an additional water is added.

EXAMPLE 12

| | |
|---|---|
| copper phthalocyanine blue (pigment) | 10 parts |
| ammonium salt of styrene-maleic acid copolymer (dispersant) | 5 parts |
| sodium N-myristoyl sarcosinate | 1.5 parts |

-continued

| | |
|---|---|
| ("Sarcosinate MN", Nikko Chemicals Ltd.) | |
| ethylene glycol | 20 parts |
| glycerin | 13 parts |
| water | 50 parts |
| guar gum | 0.5 part |

A blue ink having a viscosity of 405 cps is obtained in the same manner as that of the Example 11 with regard to the above components.

Comparative Sample 9

A blue ink having a viscosity of 400 cps is obtained in the same manner as that of the Example 12 except that the sodium N-myristoyl sarcosinate is removed, and in place of the same an additional water is added.

EXAMPLE 13

| | |
|---|---|
| permanent red (C.I. 15865)(pigment) | 12.0 parts |
| amine salt of styrene-maleic acid copolymer (dispersant) | 5.0 parts |
| sodium N-oleoyl sarcosinate | 1.0 part |
| ethylene glycol | 20 parts |
| glycerin | 13 parts |
| water | 48.5 parts |
| hydroxypropylcellulose | 0.5 part |

With regard to the above components, a red ink having a viscosity of 340 cps is obtained in the same manner as that of the Example 11.

Comparative Sample 10

A red ink having a viscosity of 330 cps is obtained in the same manner as that of the Example 13 except that the sodium N-oleoyl sarcosinate employed in the Example 13 is removed, and in place of the same an additional water is added.

The following Table 4 shows test results of the writing length of a ball-point pen a tip of which is made of nickel silver and an ink reservoir tube of which is transparent and receives the inks obtained in the Example 11 to 13 and the Comparative Samples 8 to 10. The test is conducted in the same manner as that of the Table 2.

TABLE 4

| | Writing length |
|---|---|
| Example | |
| 11 | 1400 m |
| 12 | 1550 m |
| 13 | 1500 m |
| Comparative Sample | |
| 8 | 200 m |
| 9 | 300 m |
| 10 | 250 m |

As is clear from the Table 4, the water-based pigment ink of the present invention selecting its viscosity in a range of from 50 to 2000 cps also can effectively prevent the wear of the ball seat caused by the rotation of the ball to resolve the ink shortage problem in writing due to the ball retraction. Further, by the use of the ink having such viscosity, it is possible to provide a ball-point pen provided with advantages of both of the oil-based ink type conventional ball-point pen employing a large viscosity oil-based ink and the water-based ink type conventional ball-point pen employing a low viscosity water-based ink.

What is claimed is:

1. In a water-based ink composition for a ball-point pen consisting essentially of a pigment; a dispersant for said pigment; a water-soluble organic solvent and water; the improvement wherein the composition contains a metal salt and/or an amine salt of N-acyl sarcosine represented by the following formula:

$$R_1-\underset{\underset{O}{\|}}{\overset{\overset{R_2}{|}}{C}}-NCH_2COOX \qquad (I)$$

where $R_1$ is a saturated or unsaturated hydrocarbon having 8 to 20 carbon atoms; $R_2$ is H or alkyl group having 1 to 3 carbon atoms; X is a metal selected from the group consisting of Na and K, or an amine selected from the group consisting of $NH_3$ and $NH_2C_2H_4OH$; the amount of said metal salt and/or amine salt of N-acyl sarcosine being in a range of from 0.02 to 10 wt. % of the total amount of said water-based ink composition; said sarcosine compound functioning as a lubricant in the composition for the purpose of acting as a lubricant between a ball seat and the ball of a ball point pen to reduce the wear thereof when said water-based ink composition is used in a ball point pen.

2. The water-based ink composition according to claim 1, wherein the amount of said metal salt and/or amine salt of N-acyl sarcosine is in a range of from 0.5 to 7 wt. % of the total amount of said water-based ink composition.

3. The water-based ink composition according to claim 1, wherein the viscosity of said water-based ink composition in a range of from 1 to 20 cps at a temperature of 25° C.

4. The water-based ink composition according to claim 1, wherein the viscosity of said water-based ink composition is in a range of from 50 to 2000 cps at a temperature of 25° C.

5. The water-based ink composition according to claim 1, wherein said dispersant for said pigment is a water-soluble amine salt or a water-soluble ammonium salt of a copolymer composition of a hydrophilic addition-polymerizable monomer of up to 50 mol. % and a monomer of styrene and/or styrene derivative of at least 50 mol. %.

6. The water-based ink composition according to claim 1 wherein water employed in an amount of 50 to 85 wt. % and the water-soluble organic solvent is employed in an amount of 5 to 40 wt. %, both percentages being based upon the total amount of the composition.

7. The water-based ink composition according to claim 1 in which the organic solvent is selected from the group consisting of ethylene glycol, diethylene glycol, propylene glycol, ethylene glycol monomethylether, ethylene glycol monoethylether, diethylene glycol monomethylether, diethylene glycol monoethylether, sulfolan, thiodiethylene glycol and acetin.

* * * * *